June 16, 1959 — G. R. ASCHAUER — 2,890,776
TONG OPERATED FRICTION CLUTCH
Filed Dec. 13, 1955 — 2 Sheets-Sheet 1
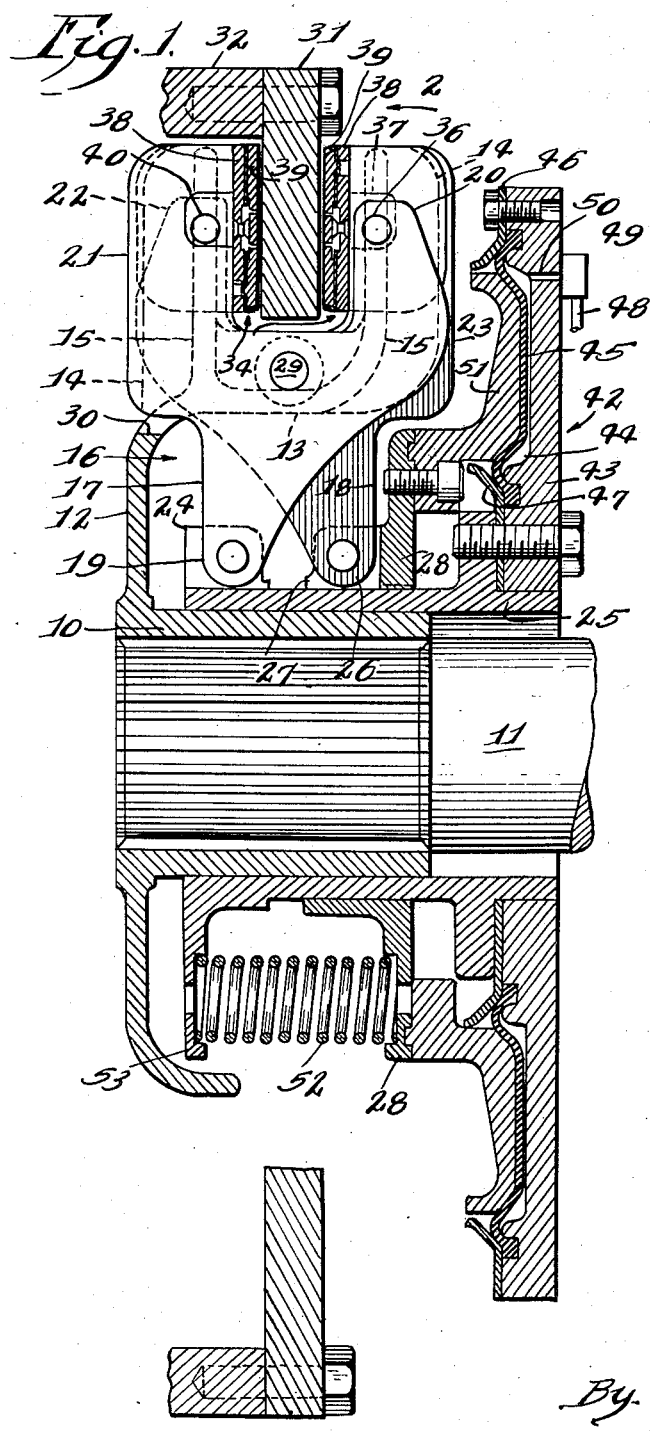
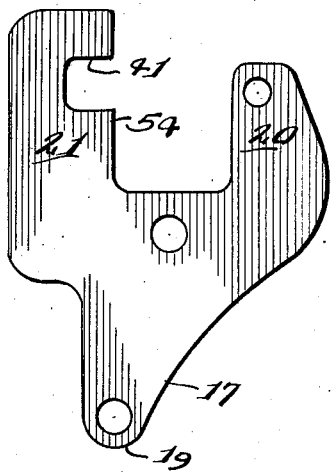
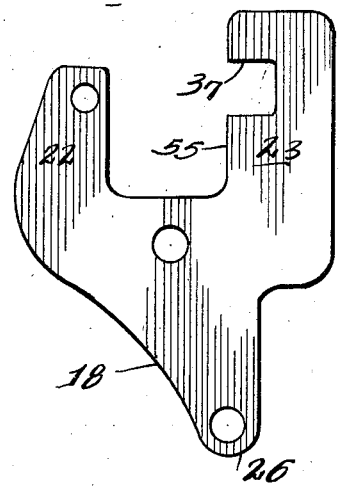
Inventor,
George R. Aschauer,
By Jeanne Darley
Attorney.

June 16, 1959     G. R. ASCHAUER     2,890,776
TONG OPERATED FRICTION CLUTCH
Filed Dec. 13, 1955     2 Sheets-Sheet 2
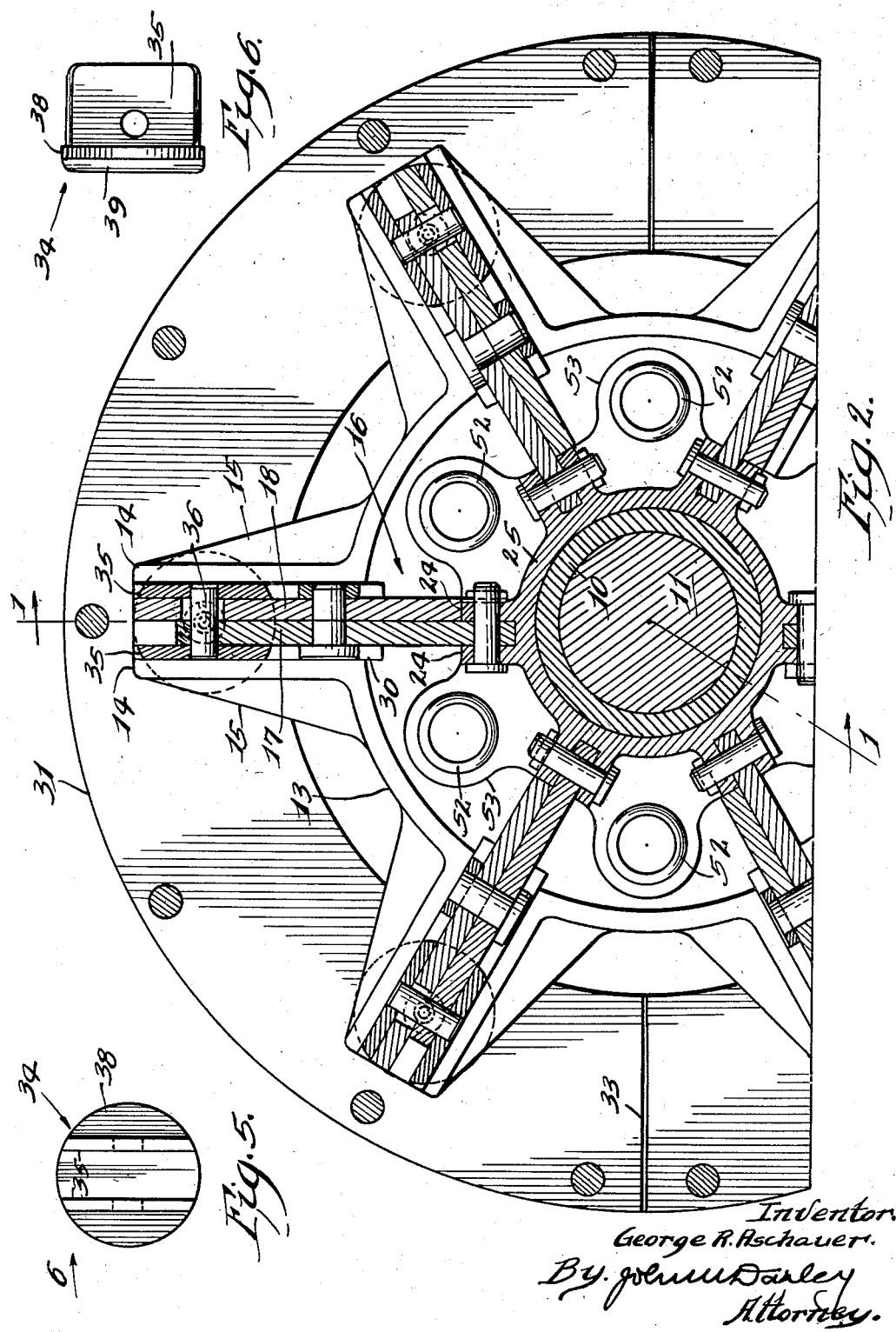
Inventor:
George R. Aschauer.
By John M. Darley
Attorney.

United States Patent Office 2,890,776
Patented June 16, 1959

2,890,776

TONG OPERATED FRICTION CLUTCH

George R. Aschauer, Racine, Wis., assignor to Twin Disc Clutch Company, Racine, Wis., a corporation of Wisconsin Application December 13, 1955, Serial No. 552,924

9 Claims. (Cl. 192—68)

My invention relates to friction clutches and more particularly to those of the high energy type whose operation is characterized by the emission of substantial amounts of heat.

One object of the invention is to provide a clutch of the indicated character in which the friction parts have substantial surfaces exposed for radiation and convection cooling, or may be liquid cooled.

A further object is to provide a clutch of the above type wherein the friction elements which are movable into and out of engagement with another friction part, such as a driving plate, are carried in straddle relation to such plate at one end of a tong, there being a plurality of such tongs spaced around the clutch.

A further object is the provision of a tong clutch in which the friction elements carried thereby take the form of buttons or pads which, for each tong, are positioned in generally opposed relation, with each button having an articulated connection to the associated tong arm to insure a high percentage of contact with the driving plate.

A further object is to provide a clutch in which the only stress to which the tong arms are subjected is the clamping stress, the tangential load on the buttons being transmitted through the main clutch frame to a connected shaft.

These and further objects of the invention will be set forth in the following specification, reference being had to the accompanying drawings, and the novel means by which said objects are effectuated will be definitely pointed out in the claims.

In the drawings:

Fig. 1 is a fragmentary, sectional elevation of the clutch in release position taken generally along the line 1—1 in Fig. 2, only one tong being shown.

Fig. 2 is a fragmentary, irregular section looking in the direction of the arrow 2 in Fig. 1.

Figs. 3 and 4 are elevations of the tong arms as viewed in Fig. 1.

Fig. 5 is an elevation of one of the articulated members which carry the friction buttons as viewed in Fig. 2.

Fig. 6 is a view of the articulated member looking in the direction of the arrow 6 in Fig. 5.

Referring to Figs. 1 and 2 of the drawings, the numeral 10 designates the hub of the clutch which has splined or keyed connection to a shaft 11 which will be regarded as an output member, although the direction of drive through the clutch may be reversed without disturbing the structure thereof.

From the left end of the hub 10 extends a generally radial and annular web 12 which merges into an annular shell 13 that is coaxial with and spaced from the hub 10. Extending outwardly from and circumferentially spaced around the shell 13 are pairs of abutments 14—14, the elements of each such pair being appropriately spaced with their opposing faces being parallel to a radius of the clutch. The opposite side of each abutment 14 is braced by a pair of spaced ribs 15—15 that extend from the shell 13 to the radially outward ends of the associated abutment.

Operable between each pair of abutments 14—14 is a tong 16 composed of arms 17 and 18 which are shaped as flat, plate members and are identical as shown in Figs. 3 and 4, but are reversed relative to each other when connected to form the tong 16. For the tong arm 17, its lower end, as viewed in Fig. 3, or radially inward end 19 when assembled in the clutch, is the part to which force is applied to move the arm as presently described. The opposite end of the arm 17 is bifurcated to provide spaced branches 20 and 21, the latter of which possesses the greater mass for a purpose presently explained. The corresponding branches of the tong arm 18 are denoted by the numerals 22 and 23, respectively.

The radially inward end 19 of the tong arm 17 is pivotally mounted between a pair of ears 24—24 which extend radially outward from a sleeve 25 that encircles and is slidable longitudinally of the hub 10. The radially inward end 26 of the tong arm 18 is pivotally mounted between a pair of ears 27—27, only one of which is shown, provided on a ring 28 that encircles and is shiftable along the sleeve 25.

The tong arms 17 and 18 are positioned in abutting relation along their opposed, major surfaces and at a determined point radially outward of the hub 10 are pivoted together by a pin 29 in the well known tong fashion. This pivotal connection moves radially outward of the clutch when the ends 19 and 26 of the tong arms 17 and 18, respectively, are moved towards each other to engage the clutch as presently described. Further, as indicated in Figs. 1 and 2, the tong 16 extends radially outward through a slot 30 provided in the shell 13 to place the branches 20 and 21 of the tong arm 17 on opposite sides of and spaced from a driving plate 31 which is bolted to a driving member, such as an engine flywheel 32. As indicated at 33 in Fig. 2, the driving plate 31 may be made in two parts to facilitate assembly. The branches 22 and 23 of the tong arm 18 are similarly positioned with respect to the driving plate 31, so that as viewed in Fig. 1, the tong arm branches 20 and 23 lie to the right of the driving plate 31 while the branches 21 and 22 lie to the left of this plate.

Considering the right side of the tong 16, as viewed in Fig. 1, a member 34 (see Figs. 5 and 6) is pivotally connected to the branch 20 of the tong arm 17, the member consisting of a pair of spaced webs 35—35, one of which extends between one of the abutments 14 and the adjacent side of the tong branch 20 while the other web extends between the other abutment 14 and the adjacent side of the tong branch 23. The outer surfaces of the webs 35—35 have guiding and sliding relation to the coacting faces of the abutments 14—14, respectively. The pivotal connection of the webs 35 is by means of a pin 36 that extends through a suitable aperture in the branch 20 and in free working clearance through an open end notch 37 provided in the adjacent branch 23 of the tong arm 18. Bridged across the webs 35—35 between the tong branch 20 and the driving plate 31 is a disk 38 to which is riveted or otherwise fastened a button or pad 39 of suitable friction material. The drawing shows this button as being circular, but this shape may be varied as desired.

Similarly, on the left side of the driving plate 31, a member 34 is pivotally connected by a pin 40 to the tong branch 22 and this pin extends in free working clearance through an open end notch 41 provided in the adjacent tong branch 21. The relation of the webs 35 in the last noted member 34 to the adjacent abutments 14—14 and the tong branches 21 and 22 is the same as that indicated for the comparable parts on the right of the driving plate 31. The left hand member 34, as viewed in Fig. 1, also carries a friction button 39 in operative relation to the adjacent side of the driving plate 31.

The inner ends of the tong 16 may be actuated in any desired manner, but for convenience and not by way of limitation, there is shown in Fig. 1 an air actuating means 42 consisting of an annular plate 43 fast to the right end of the sleeve 25 and which plate defines an annular cylinder 44 with an annular diaphragm 45 whose outer and inner peripheries are secured to the plate 43 by retaining rings 46 and 47, respectively. Air under pressure and suitable control as to "on" and "off" periods is supplied through a pipe 48, a quick release valve 49 and a passage 50 through the plate 43 to the cylinder 44. The valve 49 is conventional, forms no part of the invention, and any desired number may be employed. Outside of the cylinder 44, the major area of the diaphragm 45 abuts an annular pressure plate 51 whose inner portion is connected to the ring 28.

In considering the operation of the clutch, the clutch is shown in release position in Fig. 1 as partly determined by a plurality of release springs 52 suitably spaced around the clutch and each interposed between the ring 28 and an ear 53 carried by the sleeve 25. The inner ends 19 and 26 of the tong arms 17 and 18, respectively, then are spaced at the maximum axial distance as shown in Fig. 1.

To engage the clutch, air pressure is established in the cylinder 44 and since the annular plate 43 and pressure plate 51 plus the diaphragm 45 are free to move, these plates do so move in opposite directions. This operation causes the inner ends 19 and 26 of the tong arms 17 and 18, respectively, to approach each other, the tong pivotal pin 29 to move radially outward of the clutch, and the friction buttons 39 carried by the respective tong branches 20 and 22 to approach each other until the buttons frictionally engage the driving plate 31 with a pressure sufficient to establish driving connection. At the same time, the tong branches 21 and 23 are moved further from each other.

When pressure in the cylinder 44 is released, the tong arms 17 and 18 are returned to the release position shown in Fig. 1. This releasing movement is assisted by centrifugal force acting on the tong branches 21 and 23 which have a counterweight function and are so related to the pivoted ends 19 and 26 as to tend to return the tong to the release position when free of air pressure.

The foregoing clutch is characterized by a number of important operating advantages. The friction surfaces are well exposed for radiation and convection cooling, or may be liquid cooled by any of the well known methods. The clutch is therefore highly suitable for those installations where a friction clutch tends to run hot.

Further, the design enables the usual back or abutment plate to be eliminated along with its tendency to bend under pressure and to wear. All of the tangential load on the friction buttons 39 is transmitted through the abutments 14—14 to the hub 10 and thence to the shaft 10. This transfer is effected by the guiding and sliding relation of the webs 35—35 to each pair of abutments 14—14 as shown in Fig. 2. The only stress to which the tong arms 17 and 18 are subjected is that arising from the clamping action.

The articulation of the friction buttons 39 to the tong arms 17 and 18 insures a relatively high percentage of area contact with the driving plate 31. When the clutch is released, the disks 38 abut the edge faces 54 and 55 on the tong branches 21 and 23 (see Figs. 3 and 4) and are held in these positions by the springs 52 so that the friction buttons 39 are positioned in generally parallel relation to the opposite sides of the driving plate 31. Accordingly, there is no possibility of these buttons hanging and having a dragging contact with the driving plate. This articulated relation of the buttons 39 possesses a further capacity to compensate for minor, axial misalignments between the input and output members and permits the elimination of the internally toothed, driving ring which is common in many clutch designs. The driving plate 31 may therefore be bolted direct to an engine flywheel or other power source.

I claim:

1. A friction clutch comprising a friction plate, a hub, a plurality of radial tongs spaced around the hub, each tong including a pair of pivotally connected arms whose radially inner ends are conditioned for relative movements axially of the clutch, and whose radially outer ends are positioned on opposite sides of the friction plate, respectively, a friction member having parts carried by each outer end of a tong arm for engagement with the plate, and a plurality of pairs of abutment members spaced around the hub and having fixed connection therewith, the abutment members in each pair being spaced and guidably and slidably receiving therebetween the associated friction member parts whereby the tangential load on the friction members is transmitted to the abutment members and thence to the hub.

2. A friction clutch comprising a friction plate, a hub, a plurality of radial tongs spaced around the hub, each tong including a pair of pivotally connected, flat, abutting arms whose radially inner ends are conditioned for relative movements axially of the clutch to engage and release the clutch, respectively, and whose radially outer ends are positioned on opposite sides of the friction plate, a friction member having parts carried by each outer end of a tong arm for engagement with the plate, and a plurality of pairs of abutment members spaced around the hub and having fixed connection therewith, the abutment members in each pair being spaced and guidably and slidably receiving therebetween the associated friction member parts whereby the tangential load on the friction members is transmitted to the abutment members and thence to the hub.

3. A friction clutch comprising a friction plate, a hub, a plurality of radial tongs spaced around the hub, each tong including a pair of pivotally connected arms whose radially inner ends are conditioned for relative movements axially of the clutch to engage and release the clutch, respectively, and whose radially outer ends are positioned on opposite sides of the friction plate, respectively, a plurality of pairs of abutment members spaced around the hub and having fixed connection therewith, the abutment members in each pair being spaced and receiving therebetween an associated tong, and a friction member carried by each outer end of a tong arm for engagement with the plate and including webs providing a guiding and sliding relation with the associated abutment members whereby the tangential load on the friction members is transmitted to the abutment members and thence to the hub.

4. A friction clutch comprising a friction plate, a hub, a plurality of radial tongs spaced around the hub, each tong including a pair of pivotally connected arms whose radially inner ends are conditioned for relative movements axially of the clutch to engage and release the clutch, respectively, and whose radially outer ends are positioned on opposite sides of the friction plate, respectively, a plurality of pairs of abutment members spaced around the hub and having fixed connection therewith, the abutment members in each pair being spaced and receiving therebetween an associated tong, and a friction member pivotally carried by each outer end of a tong arm for engagement with the plate and including webs providing a guiding and sliding relation with the associated abutment members whereby the tangential load on the friction members is transmitted to the abutment members and thence to the hub.

5. A friction clutch comprising a friction plate, a hub, a plurality of radial tongus spaced around the hub, each tong including a pair of pivotally connected, flat, abutting arms whose radially inner ends are conditioned for relative movements axially of the clutch to engage and release the clutch, respectively, and whose radially outer ends are bifurcated to provide branches positioned on opposite sides of the friction plate, respectively, and a friction member carried by one branch of each tong arm to place the friction members on opposite sides of the friction plate, the other branches each including a flat surface against which the adjacent friction member abuts in parallel relation to the friction plate when the clutch is released.

6. A friction clutch comprising a friction plate, a hub, a plurality of radial tongs spaced around the hub, each tong including a pair of pivotally connected, flat, abutting arms whose radially inner ends are conditioned for relative movements axially of the clutch to engage and release the clutch, respectively, and whose radially outer ends are bifurcated to provide branches positioned on opposite sides of the friction plate, respectively, a friction member having parts carried by one branch of each tong arm to place the friction members on opposite sides of the friction plate, the other branches each including a flat, edge surface against which the adjacent friction member abuts in parallel relation to the friction plate when the clutch is released, and a plurality of pairs of abutment members spaced around the hub and having fixed connection therewith, the abutment members in each pair being spaced and guidably and slidably receiving therebetween the associated friction member parts whereby the tangential load on the friction members is transmitted to the abutment members and thence to the hub.

7. A friction clutch comprising a friction plate, a hub, a plurality of radial tongs spaced around the hub, each tong including a pair of pivotally connected, flat, abutting arms whose radially inner ends are conditioned for relative movements axially of the clutch to engage and release the clutch, respectively, and whose radially outer ends are bifurcated to provide branches positioned on opposite sides of the friction plate, respectively, a plurality of pairs of abutment members spaced around the hub and having fixed connection therewith, the abutment members in each pair being spaced and receiving therebetween an associated tong, a friction member carried by one branch of each tong arm to place the friction members on opposite sides of the friction plate, the other branches each including a flat, edge surface against which the adjacent friction member abuts in parallel relation to the friction plate when the clutch is released, and webs carried by each friction member providing a guiding and sliding relation with the associated abutment members whereby the tangential load on the friction members is transmitted to the abutment members and thence to the hub.

8. A friction clutch comprising a friction plate, a hub, a first annular member telescoped over the hub and a second annular member telescoped over the first annular member, the first and second annular members being conditioned for axial movements relative to each other and the hub, a plurality of radial tongs spaced around the hub, each tong including a pair of pivotally connected arms whose radially inner ends are respectively connected to the first and second annular members and whose radially outer ends are positioned on opposite sides of the friction plate, a friction member carried by each outer end of a tong arm for engagement with the plate, means for relatively moving the first and second members to cause the tongs to shift the friction members to engaging position, and spring means interposed between the first and second members for biasing the tongs to release position.

9. A friction clutch comprising a friction plate, a hub, a plurality of radial tongs spaced around the hub, each tong including a pair of pivotally connected arms whose radially inner ends are conditioned for relative movements axially of the clutch to engage and release the clutch, respectively, and whose radially outer ends are bifurcated to provide branches positioned on opposite sides of the friction plate, respectively, the branches being major and minor with respect to their mass and the major and minor branches of the tong arms being disposed on opposite sides of the friction plate, respectively, and the major and minor branches of the respective arms being located adjacent each other on the same side of the friction plate, a friction member carried by each minor branch for engagement with the friction plate, means for moving the inner ends of the tong arms to engage the friction members with the friction plate and to move the major branches away from the friction plate, and means for releasing the clutch including centrifugal action on the major branches and springs interposed between devices connected to the inner ends of the tong arms.

References Cited in the file of this patent
UNITED STATES PATENTS

| | | |
|---|---|---|
| 281,242 | Crowell | July 17, 1883 |
| 491,444 | Pickles | Feb. 7, 1893 |
| 2,424,922 | Sadon | July 22, 1947 |

FOREIGN PATENTS

| | | |
|---|---|---|
| 121,434 | Germany | June 13, 1901 |
| 690,781 | France | Sept. 25, 1930 |

OTHER REFERENCES

Ceramellic Brake Lining, copyright 1953, Bendix Aviation Corporation Form #12-209 (6 pages).